United States Patent
Li et al.

(10) Patent No.: US 11,205,427 B2
(45) Date of Patent: Dec. 21, 2021

(54) METHOD, APPARATUS, SYSTEM, DEVICE FOR CONTROLLING INTELLIGENT DEVICE AND STORAGE MEDIUM

(71) Applicant: BEIJING XIAOMI INTELLIGENT TECHNOLOGY CO., LTD., Beijing (CN)

(72) Inventors: Fuxin Li, Beijing (CN); Shuai Zhang, Beijing (CN)

(73) Assignee: BEIJING XIAOMI INTELLIGENT TECHNOLOGY CO., LTD., Beijing (CN)

( * ) Notice: Subject to any disclaimer, the term of this patent is extended or adjusted under 35 U.S.C. 154(b) by 179 days.

(21) Appl. No.: 16/557,678

(22) Filed: Aug. 30, 2019

(65) Prior Publication Data
US 2020/0175981 A1 Jun. 4, 2020

(30) Foreign Application Priority Data
Nov. 30, 2018 (CN) .......................... 201811458344.1

(51) Int. Cl.
*G10L 15/22* (2006.01)
*G10L 15/18* (2013.01)

(52) U.S. Cl.
CPC .......... *G10L 15/22* (2013.01); *G10L 15/1815* (2013.01); *G10L 2015/223* (2013.01)

(58) Field of Classification Search
USPC ...................................................... 704/1–504
See application file for complete search history.

(56) References Cited

U.S. PATENT DOCUMENTS

| 6,640,145 | B2 * | 10/2003 | Hoffberg | G05B 19/0426 |
| | | | | 700/17 |
| 7,006,881 | B1 * | 2/2006 | Hoffberg | G05B 15/02 |
| | | | | 700/17 |
| 9,197,736 | B2 * | 11/2015 | Davis | G10L 15/22 |
| 10,089,072 | B2 * | 10/2018 | Piersol | G06F 3/167 |
| 10,567,477 | B2 * | 2/2020 | Sumner | G06F 3/167 |
| 10,733,993 | B2 * | 8/2020 | Kudurshian | G06F 3/167 |

(Continued)

FOREIGN PATENT DOCUMENTS

| CN | 104197299 A | 12/2014 |
| CN | 105516747 A | 4/2016 |

(Continued)

OTHER PUBLICATIONS

Extended European Search Report dated Jul. 28, 2020 in European Patent Application No. 19210961.9, 14 pages.

(Continued)

*Primary Examiner* — Marcus T Riley
(74) *Attorney, Agent, or Firm* — Oblon, McClelland, Maier & Neustadt, L.L.P.

(57) ABSTRACT

The disclosure relates to a method, an apparatus, a system and a device for controlling an intelligent device, and a storage medium. The method includes collecting voice data of a user; performing semantic recognition processing on the collected voice data of the user to obtain a recognition result; determining a target intelligent device based on device information in the recognition result; generating a control command based on operation instruction information in the recognition result; and sending the control command to the target intelligent device.

15 Claims, 13 Drawing Sheets

(56) References Cited

U.S. PATENT DOCUMENTS

| | | | |
|---|---|---|---|
| 10,785,365 B2* | 9/2020 | Rodriguez | G06F 3/04847 |
| 2011/0161076 A1* | 6/2011 | Davis | G06F 9/50 704/231 |
| 2014/0100854 A1 | 4/2014 | Chen et al. | |
| 2014/0323142 A1* | 10/2014 | Rodriguez | G06K 9/00335 455/452.1 |
| 2014/0337733 A1* | 11/2014 | Rodriguez | G06F 9/50 715/718 |
| 2016/0378080 A1 | 12/2016 | Uppala et al. | |
| 2017/0289341 A1* | 10/2017 | Rodriguez | G06K 9/00335 |
| 2017/0357478 A1* | 12/2017 | Piersol | G10L 15/30 |
| 2020/0175981 A1* | 6/2020 | Li | G10L 15/1815 |
| 2021/0112154 A1* | 4/2021 | Rodriguez | G06F 3/0488 |

FOREIGN PATENT DOCUMENTS

| | | |
|---|---|---|
| CN | 105629747 A | 6/2016 |
| CN | 107566226 A | 1/2018 |
| CN | 108520746 A | 9/2018 |
| CN | 108702313 A | 10/2018 |
| EP | 3 382 698 | 10/2018 |

OTHER PUBLICATIONS

Combined Chinese Office Action and Search Report dated Aug. 25, 2020 in Chinese Patent Application No. 201811458344.1, 10 pages.

* cited by examiner

METHOD, APPARATUS, SYSTEM, DEVICE FOR CONTROLLING INTELLIGENT DEVICE AND STORAGE MEDIUM

CROSS-REFERENCE TO RELATED APPLICATIONS

This application is based upon and claims priority to Chinese Patent Application No. 201811458344.1 filed oil Nov. 30, 2018, the entire contents of which are incorporated herein by reference.

TECHNICAL FIELD

The present disclosure relates to the technical field of artificial intelligence, and more particularly to a method, an apparatus, a system and a device for controlling an intelligent device, and a storage medium.

BACKGROUND

With the development of human-computer interaction, voice interaction is more and more convenient for users. The voice interaction method greatly releases two hands from operation. For example, a user may control an intelligent device through voice interaction, such as operating a lamp, a switch, and an air purifier at home and the like. In general, an intelligent device may be controlled with one sentence. The intelligent device may be controlled by performing literal intent recognition on user's voice operation instruction.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for controlling an intelligent device. The method includes collecting voice data of a user; performing semantic recognition processing on the collected voice data of the user to obtain a recognition result; determining a target intelligent device based on device information in the recognition result; generating a control command based on operation instruction information in the recognition result; and sending the control command to the target intelligent device.

According to an aspect, the method further includes determining and storing device information of the intelligent device in advance, wherein the device information includes first device information and/or second device information, the first device information is provided by the intelligent device, and the second device information is input by the user, and wherein the first device information includes at least one of: device identification information, device state information, device attribute information, and information on firmware used by the device, and wherein the second device information includes at least one of: device location information, and device name information.

In an example, when determining the target intelligent device based on the device information in the recognition result, the method further includes determining, from stored information of intelligent devices, device information that matches the device information in the recognition result; and determining an intelligent device corresponding to the matching device information as the target intelligent device.

In another example, after determining the device information that matches the device information in the recognition result, the method further includes acquiring a current online state of the intelligent device corresponding to the matching device information, and wherein determining the intelligent device corresponding to the matching device information as the target intelligent device includes: among intelligent devices corresponding to the matching device information, determining an intelligent device that is currently online as the target intelligent device.

In yet another example, in the method, for the operation instruction information characterizing that an attribute value of a corresponding attribute of the target intelligent device needs to be modified, generating the control command based on the operation instruction information in the recognition result includes acquiring a current attribute value of a corresponding attribute of the target intelligent device; determining a modified attribute value based on the operation instruction information; and generating a control command based on the modified attribute value.

According to an aspect, the method further includes, if receiving no operation response from the target intelligent device within a preset time period, or detecting that a current firmware version of the target intelligent device is not the latest version, pushing firmware version upgrade instruction information to the user, wherein the firmware version upgrade instruction information reminds the user that the firmware version of the target intelligent device needs to be upgraded.

Aspects of the disclosure also provide an electronic device. The electronic device includes a receiver; a transmitter; a processor; and a memory configured to store instructions executable by the processor. The processor is configured to collect voice data of a user; perform semantic recognition processing on the collected voice data of the user to obtain a recognition result; determine a target intelligent device based on device information in the recognition result; generate a control command based on operation instruction information in the recognition result; and send the control command to the target intelligent device.

Aspects of the disclosure also provide a non-transitory computer-readable storage medium having stored thereon instructions that, when executed by a processor, cause the processor to collect voice data of a user; perform semantic recognition processing on the collected voice data of the user to obtain a recognition result; determine a target intelligent device based on device information in the recognition result; generate a control command based on operation instruction information in the recognition result; and send the control command to the target intelligent device.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the specification, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

With the development of human-computer interaction, voice interaction is more and more convenient for users. Usually, an intelligent device can be controlled according to user's intention with one sentence. Voice interaction can greatly free two hands from operation, especially in certain specific operation scenarios, such as driving, dining, and so on. With the increase of intelligent home devices, in addition to listening to songs, checking weather reports, and setting alarm clocks, users can also operate home lights, switches, air purifiers, etc. through voice interaction. The currently provided intelligent device control method only performs literal intent recognition on the user's voice operation instruction, without acquisition and understanding of a current state of an intelligent device intended by the user. Accordingly, the final operation may be performed on an intelligent device not intended by the user, resulting in poor user experience.

Therefore, a method for controlling an intelligent device provided by the aspect of the present disclosure is intended to solve the above technical problem. For the specific implementation, reference may be made to the following aspects.

Figure 1:
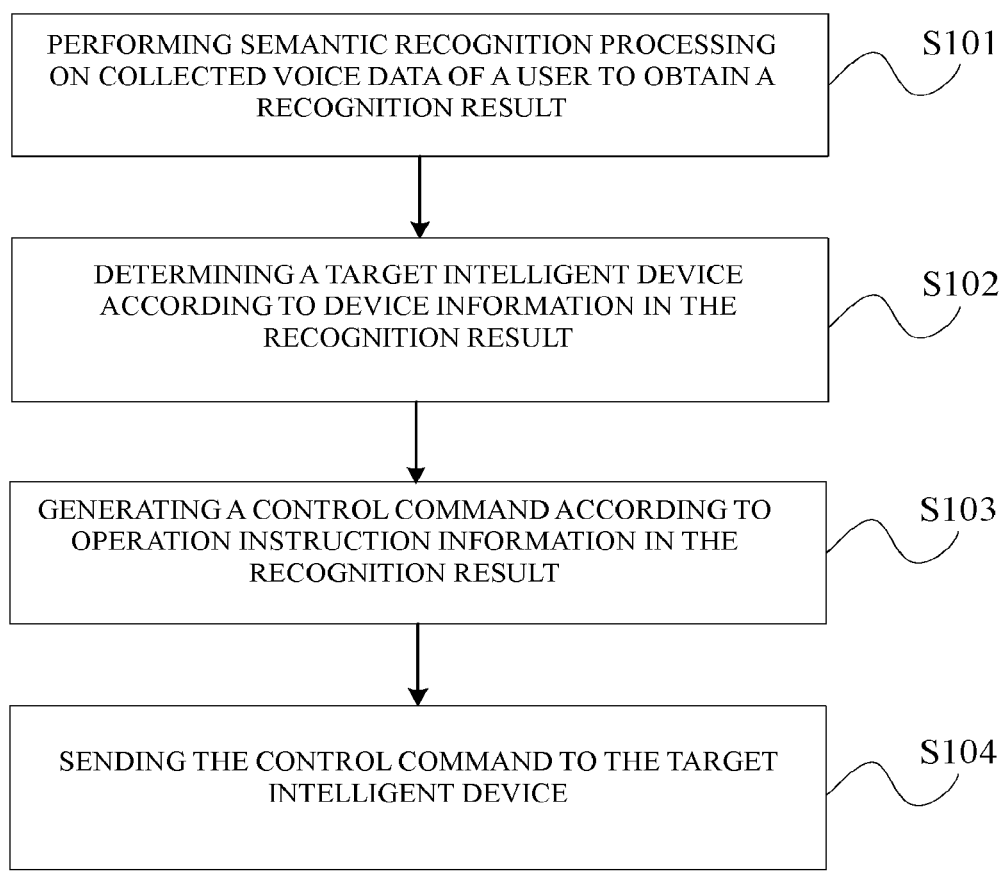
FIG. 1 is a flowchart of a first aspect of a method for controlling an intelligent device according to an exemplary aspect of the present disclosure.

FIG. 1 is a flowchart of a first aspect of a method for controlling an intelligent device according to an exemplary aspect. As shown in FIG. 1, a method for controlling an intelligent device according to this aspect may be applied to a control device, and may also be applied to a server, or a control system including a control device and a server. The control device may be a mobile phone, a PAD, or the like. The method for controlling an intelligent device specifically includes the following steps.

In step S101, semantic recognition processing is performed on collected voice data of the user to obtain a recognition result.

In step S102, a target intelligent device is determined according to device information in the recognition result.

The voice data of the user may include information of the target intelligent device, and the information of the target intelligent device may be a name and/or a location of the target intelligent device. After performing semantic recognition processing on the collected voice data of the user, a recognition result may be obtained, such as "turn on the intelligent lamp in the bedroom." Further, according to the device information in the recognition result, the target intelligent device is determined to be an "intelligent lamp". The specific manner for performing semantic recognition processing on voice data of the user is similar to those in the related art, which will not be elaborated herein.

If the recognition result is "turn on the little white in the bedroom", optionally, the device information is determined and stored in advance for the intelligent device.

The device information includes first device information and/or second device information, of which the first device information is provided by the intelligent device, and the first device information includes at least one of device identification information, device state information, device attribute information, and information on firmware used by the device.

The device identification information may be "intelligent lamp", the device state information may be "online", the device attribute information may be "brightness", and the information on firmware used by the device may be "version number of firmware".

Optionally, after an intelligent device is connected to the network, the intelligent device may report the first device information by itself, or report the first device information according to a user instruction.

The second device information is input by the user, and may include at least one of the following information: device location information, and device name information. The second device information is input by the user, for example, adding a "little white in the bedroom" identifier to the "intelligent lamp", here "little white" is the device name information, and "Bedroom" is the device location information.

Optionally, when the intelligent device is connected to the network, the user is guided to perform personalized naming, categorization, and the like. That is, the user is guided to input the second device information to the intelligent device.

The following is an explanation taking the recognition result of "turn on the little white in the bedroom" as an example.

Based on the second device information input by the user, it is determined that the "bedroom" is a room in the user's house, and "little white" is an intelligent lamp in the user's bedroom. That is, the target intelligent device is "little white/intelligent lamp in the bedroom".

In step S103, a control command is generated according to operation instruction information in the recognition result.

In step S104, the control command is sent to the target intelligent device.

The operation instruction information is instruction information for operating the intelligent device, for example, "turn on" or "turn off". A control command is generated according to the operation instruction information in the recognition result, and is used to instruct the target intelligent device to perform a "turn on" or "turn off" operation.

Further, the control command is sent to the target intelligent device to cause the target intelligent device to perform a corresponding operation, such as "turn on" or "turn off".

It should be noted that step S102 may be performed before step S103, or may be performed after step S103, which is not limited herein.

The method for controlling an intelligent device provided by the aspect of the present disclosure includes: performing semantic recognition processing on collected voice data of the user to obtain a recognition result, determining a target intelligent device according to device information in the recognition result, generating a control command according to operation instruction information in the recognition result, and sending the control command to the target intelligent device. It can realize control over the intelligent device according to the user's intention, and can improve the user experience.

Figure 2:
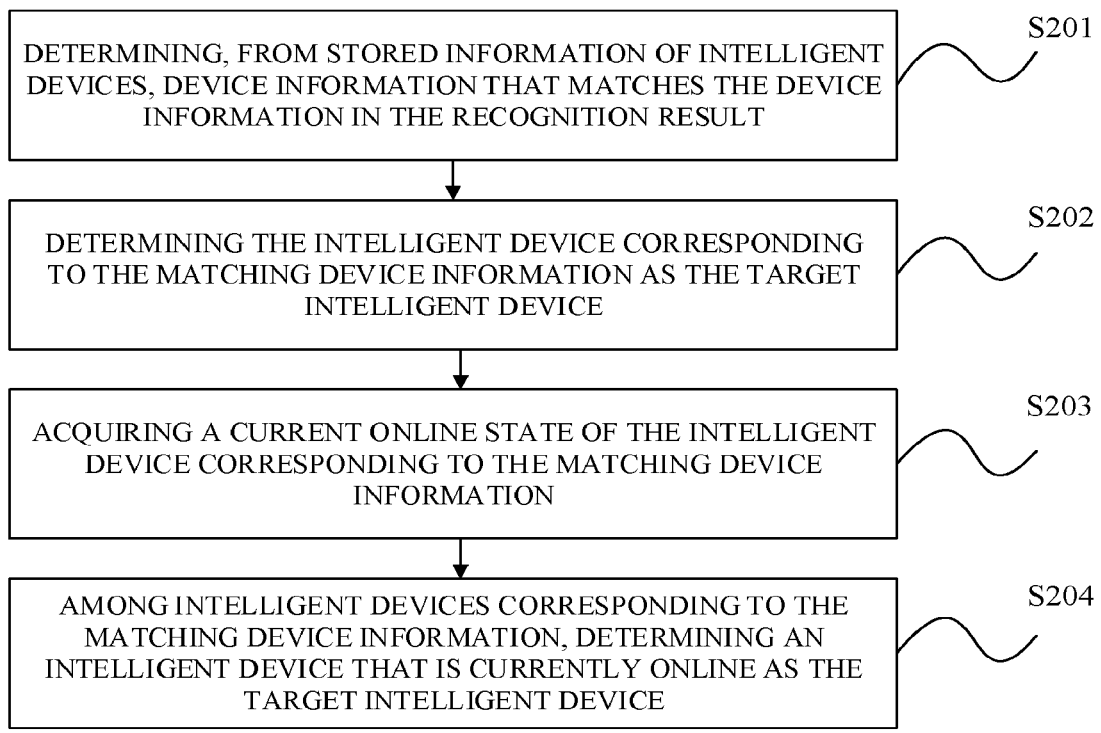
FIG. 2 is a flowchart of a second aspect of a method for controlling an intelligent device according to an exemplary aspect of the present disclosure.

FIG. 2 is a flowchart of a second aspect of a method for controlling an intelligent device according to an exemplary aspect. As shown in FIG. 2, based on the above first aspect, step S102 specifically includes the following steps.

In step S201, device information that matches the device information in the recognition result is determined from stored information of intelligent devices.

The device information is determined in advance for the intelligent device, and the device information is stored. After the recognition result is obtained in step S101, the device information in the recognition result is obtained, and then from the stored information of intelligent devices, device information that matches the device information in the recognition result is found. For example, the device information in the recognition result is "intelligent lamp", and if the "intelligent lamp" is found in the pre-stored information of the intelligent devices (i.e., from the stored information of intelligent devices), the device information that matches the device information in the recognition result is determined.

If the "intelligent lamp" is not found in the stored information of intelligent devices, the intelligent lamp can be re-networked, to report the first device information again, and the user is guided to input the second device information.

Optionally, if the device information in the recognition result is "little white", and the "little white" is not found in the stored information of intelligent devices, the second device information may be input for the intelligent device corresponding to the "little white", i.e., an identifier of "little white" is input, so that the device information that matches the device information in the recognition result can be determined from the stored information of intelligent devices.

In step S202, the intelligent device corresponding to the matching device information is determined as the target intelligent device.

In the stored information of intelligent devices, the device information that matches the device information in the recognition result is determined. For example, if the "intelligent lamp" is found, it is determined that the intelligent device corresponding to the "intelligent lamp", i.e., the intelligent lamp is determined as the target intelligent device.

If the "little white" is found in the stored information of intelligent devices, i.e., the device information that matches the device information in the recognition result is found, the intelligent device corresponding to the matching device information is determined as the target intelligent device, i.e., the intelligent device (the intelligent lamp) corresponding to "little white" is determined as the target intelligent device.

Optionally, after step S201, the method further includes the following steps.

In step S203, a current online state of the intelligent device corresponding to the matching device information is acquired. The current online state indicates whether the intelligent device is currently online.

In a possible implementation, after an intelligent device is connected to the network, the intelligent device may actively report first device information. When the first device information is the device state information, the device state information includes online or offline. Correspondingly, the current online state of the intelligent device corresponding to the matching device information is acquired.

In another possible implementation, an acquiring instruction is sent to the intelligent device corresponding to the matching device information, to obtain the current online state of the intelligent device.

Step S202 specifically includes the following steps.

In step S204, among intelligent devices corresponding to the matching device information, an intelligent device that is currently online is determined as the target intelligent device.

From stored information of intelligent devices, a plurality of intelligent devices corresponding to the device information in the recognition result may be determined, and after a current online state of each intelligent device corresponding to the matching device information is obtained, an intelligent device that is currently online is determined as the target intelligent device. For example, if the recognition result is "turn on the light of the house", the light of the user's house includes a bedroom light, a living room light, etc. When one certain living room light is offline or removed due to various reasons, it can be quickly determined which lights are online operable devices and which lights are devices that are already offline and inoperable, by obtaining a current online state of each light in the house. In this way, it can be determined that the light that the user intends to turn on is the online bedroom light instead of the offline living room light, i.e., the online bedroom light is determined as the target intelligent device.

The method for controlling an intelligent device provided by the aspect of the present disclosure includes: determining, from stored information of intelligent devices, device information that matches the device information in the recognition result; and determining the intelligent device corresponding to the matching device information as the target intelligent device. It can realize control over the intelligent device according to the user's intention, and can improve the user experience.

Figure 3:
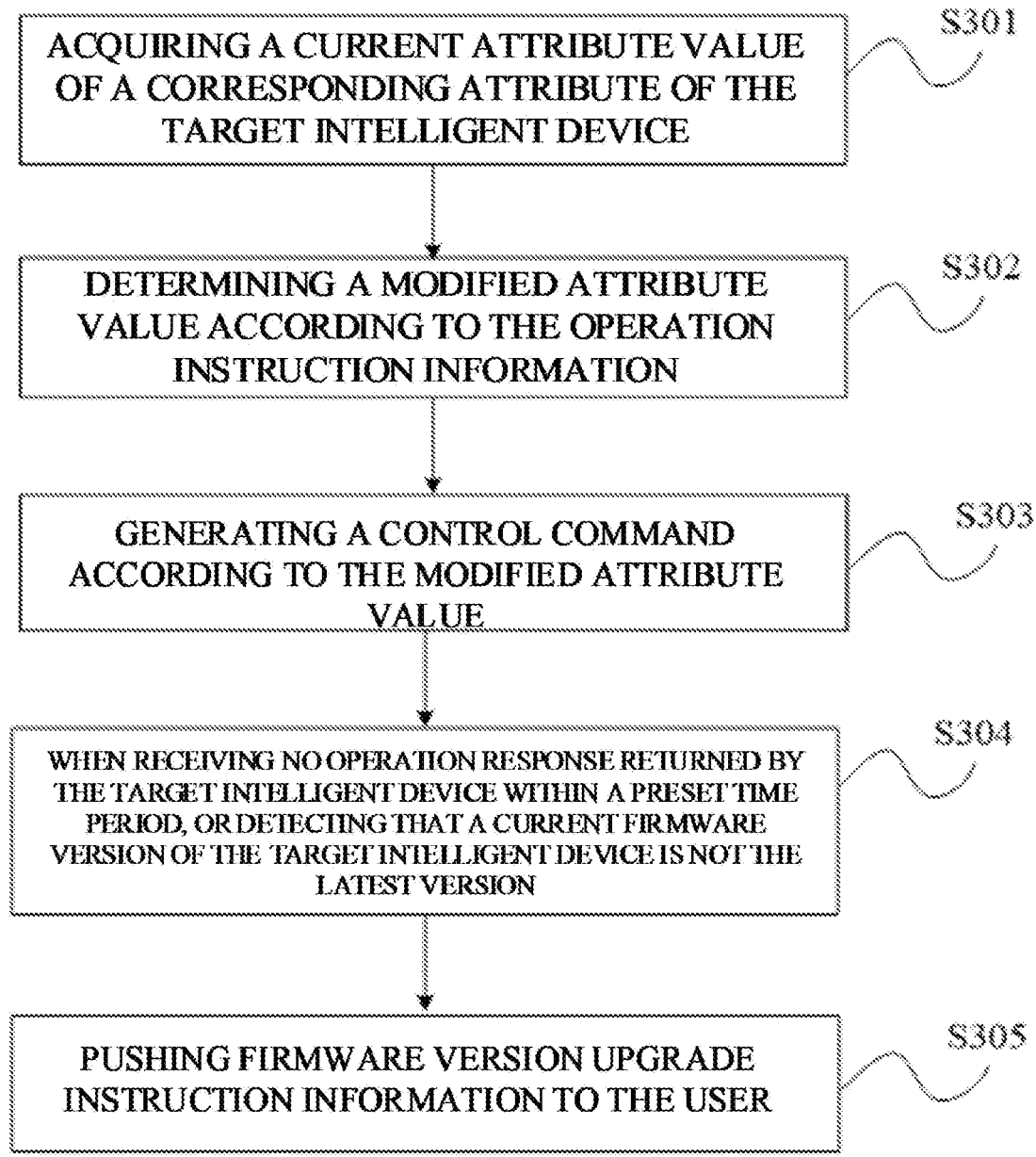
FIG. 3 is a flowchart of a third aspect of a method for controlling an intelligent device according to an exemplary aspect of the present disclosure.

FIG. 3 is a flowchart of a third aspect of a method for controlling an intelligent device according to an exemplary aspect. As shown in FIG. 3, on the basis of the above first aspect and the second aspect, Step S103 specifically includes the following steps.

In step S301, a current attribute value of a corresponding attribute of the target intelligent device is acquired.

In a possible implementation, after the target intelligent device is connected to the network, the target intelligent device actively reports the first device information, and the first device information is device attribute information. For an intelligent lamp, the device attribute information may be brightness, and the current attribute value may be 400 lux. For an intelligent air conditioner, the device attribute information may be temperature, and the current attribute value may be 18 degrees Celsius.

In another possible implementation, when the first device information reported by the target intelligent device does not have the device attribute information, an acquiring instruction may be sent to the target intelligent device to acquire the device attribute information thereof.

It should be noted that the device attribute information of the target intelligent device herein is a corresponding attribute of the target intelligent device.

In step S302, a modified attribute value is determined according to operation instruction information.

In step S303, a control command is generated according to the modified attribute value.

In the above steps, the operation instruction information is instruction information for operating the intelligent device, for example, "turn on" or "turn off". For example, when the recognition result is "raise the temperature of the air conditioner a little bit", the operation instruction information is "raise the temperature", the target intelligent device is "air conditioner", and after obtaining the temperature value (i.e., the current attribute value) corresponding to the "air conditioner" as 18 degrees Celsius, the modified temperature value may be determined (i.e., the modified attribute value) as 20 degrees Celsius based on the user's intention.

Further, based on the modified attribute value, a control command is generated to control the target intelligent device to raise the temperature from 18 degrees Celsius to 20 degrees Celsius.

Optionally, the method further includes the following steps.

In step S304, if no operation response returned by the target intelligent device is received within a preset time period, or it is detected that a current firmware version of the target intelligent device is not the latest version.

In step S305, firmware version upgrade instruction information is pushed to the user, and the firmware version upgrade instruction information reminds the user that the firmware version of the target intelligent device needs to be upgraded.

After a control command is generated, the control command is sent to the target intelligent device. When performing the corresponding operation, the target intelligent device will return an operation response. If no operation response returned by the target intelligent device is received within the preset time period, firmware version upgrade instruction information is pushed to the user, and the firmware version upgrade instruction information reminds the user that the firmware version of the target intelligent device needs to be upgraded. Optionally, the firmware upgrade instruction information is sent to the mobile phone bound with the target intelligent device to remind the user.

Similarly, when it is detected that the current firmware version of the target intelligent device is not the latest version, the firmware version upgrade information is also pushed to the user.

The method for controlling an intelligent device provided by the aspect of the present disclosure includes: acquiring a current attribute value of a corresponding attribute of the target intelligent device; determining a modified attribute value according to operation instruction information; generating a control command according to the modified attribute value; and if no operation response returned by the target intelligent device is received within a preset time period, or it is detected that a current firmware version of the target intelligent device is not the latest version, pushing to the user firmware version upgrade instruction information, and the firmware version upgrade instruction information reminding the user that the firmware version of the target intelligent device needs to be upgraded. It can realize control over the intelligent device according to the user's intention, and can improve the user experience.

Based on the above several aspects, the following is a detailed description of the detailed process of the solution performed by a control system (including a control device and a server), in which the control device is a mobile phone and the target intelligent device is an air conditioner.

In a first step, device information for an intelligent device is determined and stored in advance.

An application corresponding to the air conditioner is installed on the mobile phone. When binding each intelligent device, the mobile phone obtains the device information of each intelligent device and sends it to the server, and correspondingly, the server receives and stores the device information.

In a second step, semantic recognition processing is performed on collected voice data of the user to obtain a recognition result.

The mobile phone collects the user's voice data, and obtains the recognition result, for example, "turn on the air conditioner at home", and sends the recognition result to the server.

In a third step, a target intelligent device is determined according to the device information in the recognition result.

The server determines the device information that matches the air conditioner from the stored information of intelligent devices, and obtains the current online state of the air conditioner, and determines the current online air conditioner at home as the target intelligent device.

In a fourth step, a control command is generated according to the operation instruction information in the recognition result.

In a fifth step, a control command is sent to the target intelligent device.

When the operation instruction information is turning on the air conditioner, the server generates a control command according to the operation instruction information, and sends the control command to the mobile phone. The mobile phone then forwards the control command to the air conditioner to turn on the air conditioner.

When the operation instruction information is to raise the temperature of the air conditioner, the server needs to obtain the current temperature value of the air conditioner, and then to raise the temperature based on the current temperature value. The server generates a control command, and sends it to the mobile phone. The mobile phone then forwards the control command to the air conditioner to raise the temperature of the air conditioner.

In the sixth step, if no operation response returned by the target intelligent device is received within a preset time period, or it is detected that a current firmware version of the target intelligent device is not the latest version.

In the seventh step, firmware version upgrade instruction information is pushed to the user.

If the server does not receive the operation response returned by the target intelligent device within a preset time period, or detects that the current firmware version of the target intelligent device is not the latest version, the server sends firmware version upgrade instruction information to the mobile phone, and the mobile phone then pushes the firmware upgrade instruction information to the user.

In the solution provided by the aspect of the present disclosure, semantic recognition processing is performed on collected voice data of the user to obtain a recognition result, a target intelligent device is determined according to device information in the recognition result, a control command is generated according to operation instruction information in the recognition result, and the control command is sent to the target intelligent device. Thereby, it can realize control over the intelligent device according to the user's intention, and can improve the user experience.

The present disclosure provides an apparatus for controlling an intelligent device, and the apparatus can be configured to perform the technical solutions in the methods illustrated in FIGS. 1 through 3.

Figure 4:
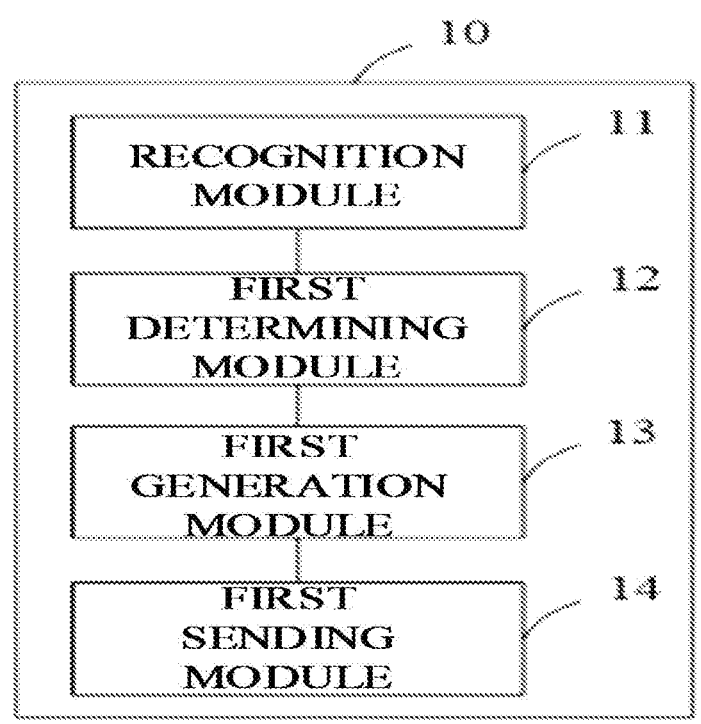
FIG. 4 is a block diagram of a first aspect of an apparatus for controlling an intelligent device according to an exemplary aspect of the present disclosure.

Referring to FIG. 4, FIG. 4 is a block diagram of a first aspect of an apparatus for controlling an intelligent device according to an exemplary aspect. An apparatus 10 for controlling an intelligent device includes:

a recognition module 11 configured to perform semantic recognition processing on collected voice data of a user to obtain a recognition result;

a first determining module 12 configured to determine a target intelligent device according to device information in the recognition result;

a first generation module 13 configured to generate a control command according to operation instruction information in the recognition result; and a first sending module 14 configured to send the control command to the target intelligent device.

The apparatus for controlling an intelligent device provided by the aspect is configured to perform the technical solution of the method for controlling an intelligent device according to any of the above method aspects with the similar principal and technical effects. The recognition module performs semantic recognition processing on collected voice data of a user to obtain a recognition result; the first determining module determines a target intelligent device according to device information in the recognition result; the first generation module generates a control command according to operation instruction information in the recognition result; and the first sending module sends the control command to the target intelligent device. It can realize control over the intelligent device according to the user's intention, and can improve the user experience.

Figure 5:
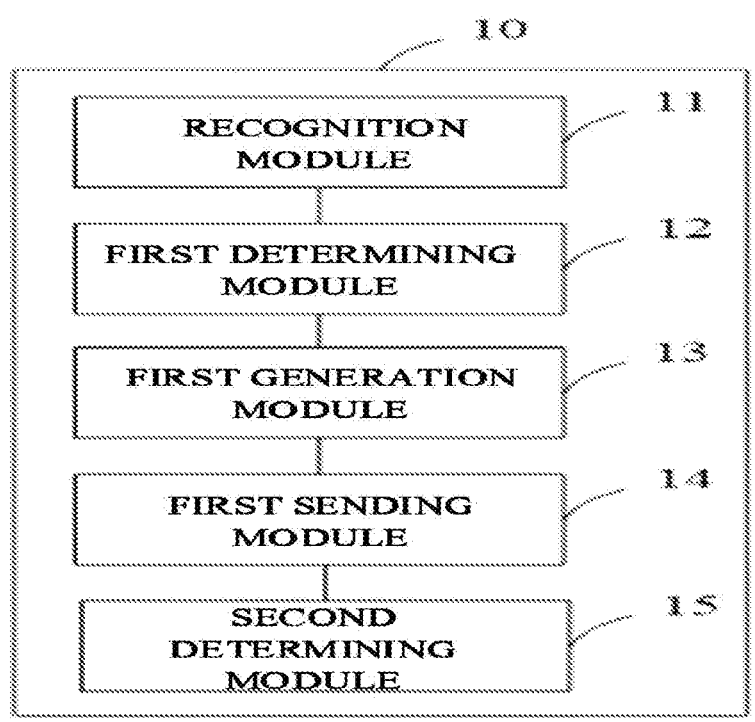
FIG. 5 is a block diagram of a second aspect of an apparatus for controlling an intelligent device according to an exemplary aspect of the present disclosure.

Based on the aspect as shown in FIG. 4, FIG. 5 is a block diagram of a second aspect of an apparatus for controlling an intelligent device according to an exemplary aspect. Referring to FIG. 5, the apparatus 10 for controlling an intelligent device also includes:

a second determining module 15 configured to determine and store device information of the intelligent device in advance;

wherein the device information includes first device information and/or second device information, the first device information is provided by the intelligent device, and the second device information is input by the user; and the first device information includes at least one of device identification information, device state information, device attribute information, and information on firmware used by the device, and the second device information includes at least one of: device location information, and device name information.

Figure 6:
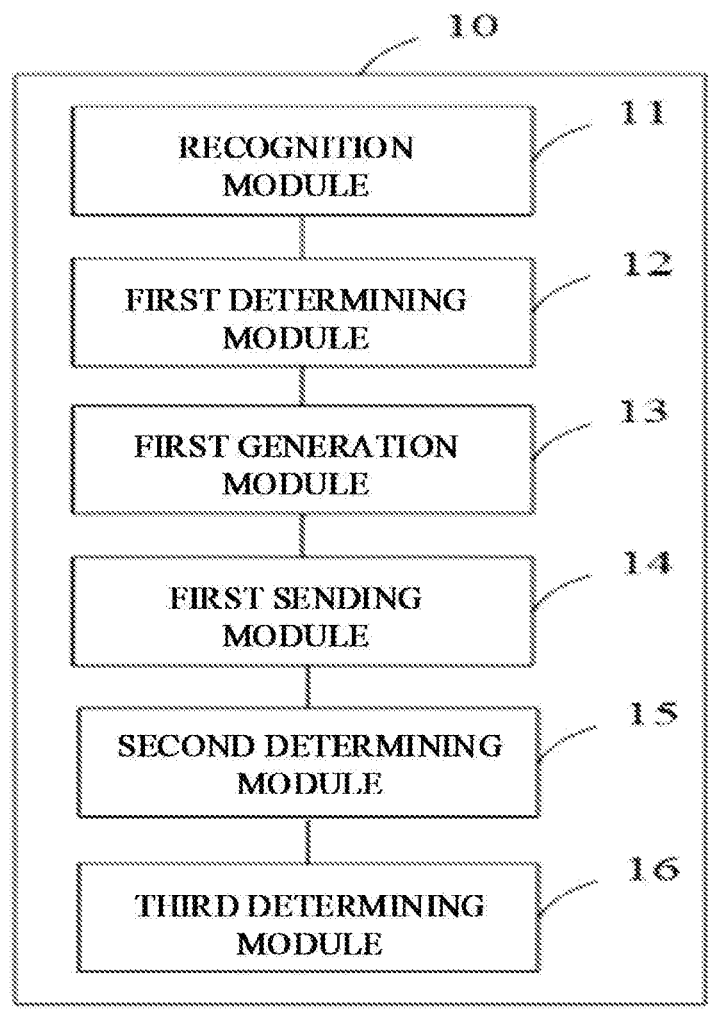
FIG. 6 is a block diagram of a third aspect of an apparatus for controlling an intelligent device according to an exemplary aspect of the present disclosure.

Based on the aspect as shown in FIG. 4 or FIG. 5, FIG. 6 is a block diagram of a third aspect of an apparatus for controlling an intelligent device according to an exemplary aspect. Referring to FIG. 6, the apparatus 10 for controlling an intelligent device also includes a third determining module 16 configured to:

determine, from stored information of intelligent devices, device information that matches the device information in the recognition result; and determine an intelligent device corresponding to the matching device information as the target intelligent device.

Figure 7:
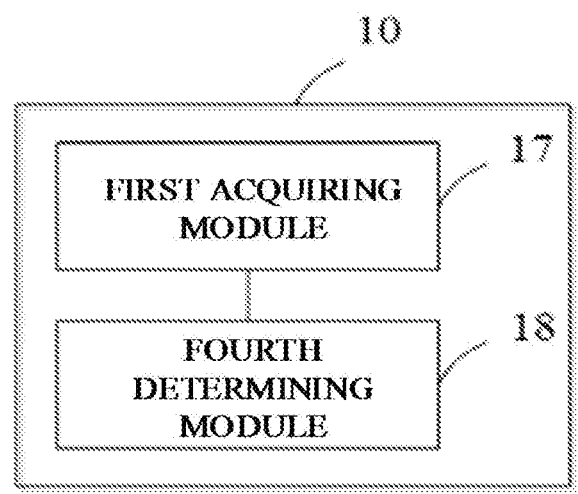
FIG. 7 is a block diagram of a fourth aspect of an apparatus for controlling an intelligent device according to an exemplary aspect of the present disclosure.

Based on the aspect as shown in FIG. 4, FIG. 5 or FIG. 6, FIG. 7 is a block diagram of a fourth aspect of an apparatus for controlling an intelligent device according to an exemplary aspect. Referring to FIG. 7, the apparatus 10 for controlling an intelligent device also includes:

a first acquiring module 17 configured to acquire a current online state of the intelligent device corresponding to the matching device information; and a fourth determining module 18 configured to, among intelligent devices corresponding to the matching device information, determine an intelligent device that is currently online as the target intelligent device.

Figure 8:
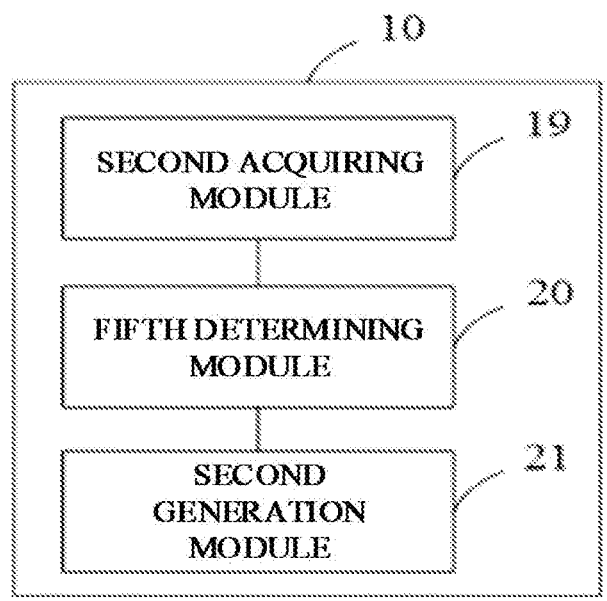
FIG. 8 is a block diagram of a fifth aspect of an apparatus for controlling an intelligent device according to an exemplary aspect of the present disclosure.

Based on the aspect as shown in FIG. 4, FIG. 5, FIG. 6 or FIG. 7, FIG. 8 is a block diagram of a fifth aspect of an apparatus for controlling an intelligent device according to an exemplary aspect. Referring to FIG. 8, the apparatus 10 for controlling an intelligent device also includes:

a second acquiring module 19 configured to acquire a current attribute value of a corresponding attribute of the target intelligent device;

a fifth determining module 20 configured to determine a modified attribute value according to the operation instruction information; and a second generation module 21 configured to generate a control command according to the modified attribute value.

Figure 9:
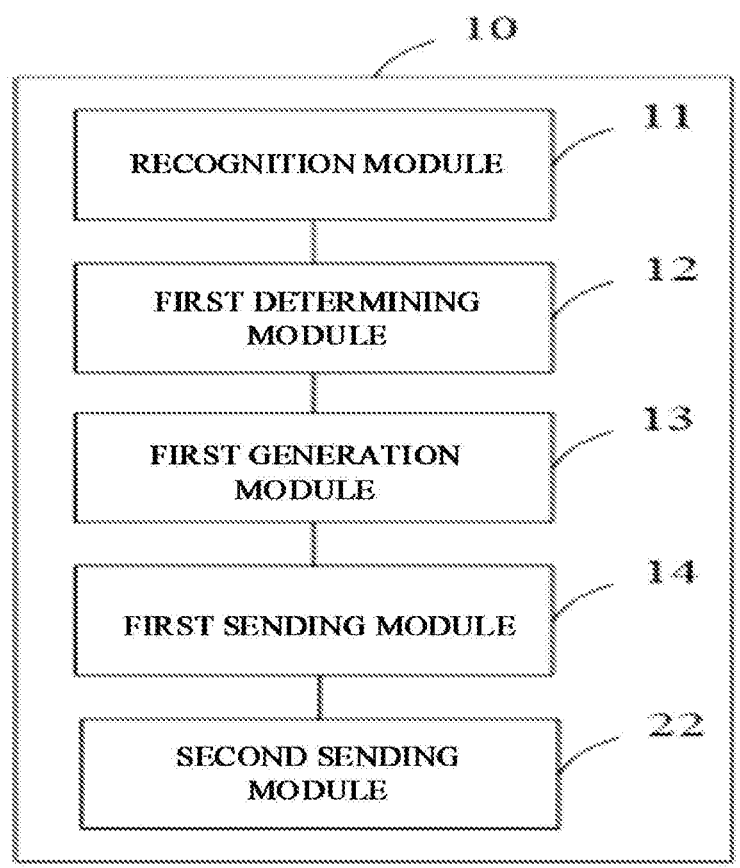
FIG. 9 is a block diagram of a sixth aspect of an apparatus for controlling an intelligent device according to an exemplary aspect of the present disclosure.

Based on the aspect as shown in FIG. 4, FIG. 5, FIG. 6 FIG. 7 or FIG. 8, FIG. 9 is a block diagram of a sixth aspect of an apparatus for controlling an intelligent device according to an exemplary aspect. Referring to FIG. 9, the apparatus 10 for controlling an intelligent device also includes:

a second sending module 22 configured to, if receiving no operation response returned by the target intelligent device within a preset time period, or detecting that a current firmware version of the target intelligent device is not the latest version, push firmware version upgrade instruction information to the user, wherein the firmware version upgrade instruction information reminds the user that the firmware version of the target intelligent device needs to be upgraded.

With regard to the apparatus in the above aspects, the specific manner in which the respective modules perform the operations has been described in detail in the aspects relating to the methods, which will not be repeated herein. The apparatus for controlling an intelligent device in the above aspects may be implemented as an electronic device, which may be a server, a control device, or a control system (including a server and a control device).

The present disclosure also provides a system for controlling an intelligent device, and the apparatus may be configured to perform the technical solution in the methods as shown in FIGS. 1-3.

Figure 10:
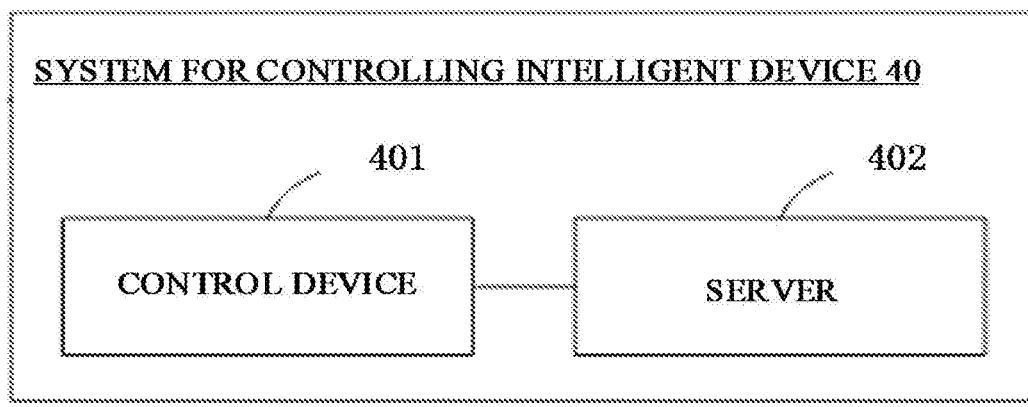
FIG. 10 is a block diagram of an aspect of a system for controlling an intelligent device according to an exemplary aspect of the present disclosure.

Referring to FIG. 10, FIG. 10 is a block diagram of an aspect of a system for controlling an intelligent device according to an exemplary aspect. The system 40 for controlling an intelligent device includes: a control device 401 and a server 402.

The control device 401 is configured to collect voice data of a user; recognize the voice data, to obtain voice recognition data; and send the voice recognition data to the server 402.

The server 402 is configured to receive the voice recognition data sent by the control device 401; perform semantic recognition processing on the voice recognition data to obtain a recognition result; determine a target intelligent device according to device information in the recognition result; generate a control command according to operation instruction information in the recognition result; and send the control command and target device information to the control device 401.

The control device 401 is further configured to send the control command to the target intelligent device.

The system for controlling an intelligent device provided by the aspect of the present disclosure includes a control device and a server, the control device is configured to collect voice data of a user; recognize the voice data, to obtain voice recognition data; and send the voice recognition data to the server; the server is configured to receive the voice recognition data sent by the control device; perform semantic recognition processing on the voice recognition data to obtain a recognition result; determine a target intelligent device according to device information in the recognition result; generate a control command according to operation instruction information in the recognition result; and send the control command and target device information to the control device; and the control device is further configured to send the control command to the target intelligent device. Thereby, it can realize control over the intelligent device according to the user's intention, and can improve the user experience.

In a specific implementation, the control device 401 is further configured to determine device information of the intelligent device; and send the device information to the server 402. The server 402 receives and stores the device information sent by the control device 401. The device information includes first device information and/or second device information, the first device information is provided by the intelligent device, and the second device information is input by the user; and the first device information includes at least one of device identification information, device state information, device attribute information, and information on firmware used by the device, and the second device information includes at least one of: device location information, and device name information.

In the solution provided by the aspect of the present disclosure, device information of the intelligent device is determined and stored in advance. All information of the intelligent device is stored in order to subsequently acquire the target intelligent device according to the device information in the user voice data.

In a specific implementation, the server 402 is further configured to determine, from stored information of intelligent devices, device information that matches the device information in the recognition result; and determine an intelligent device corresponding to the matching device information as the target intelligent device.

In the solution, the server is further configured to determine, from stored information of intelligent devices, device information that matches the device information in the recognition result, and determine an intelligent device corresponding to the matching device information as the target intelligent device. Thereby, it can determine the target intelligent device according to the device information.

In a specific implementation, the server 402 is further configured to acquire a current online state of the intelligent device corresponding to the matching device information; and among intelligent devices corresponding to the matching device information, determine an intelligent device that is currently online as the target intelligent device.

In the solution, the server determines an intelligent device that is currently online as the target intelligent device. Thereby, it can ensure that the determined target intelligent device is in an online state.

In a specific implementation, the server 402 is further configured to acquire a current attribute value of a corresponding attribute of the target intelligent device; determine a modified attribute value according to the operation instruction information; and generate a control command according to the modified attribute value. Thereby, it can control the target intelligent device to perform corresponding operation.

In a specific implementation, the server 402 is further configured to, when receiving no operation response returned by the target intelligent device within a preset time period, or detecting that a current firmware version of the target intelligent device is not the latest version, send firmware upgrade instruction information to the control device, and the control device receives the firmware upgrade instruction information, and pushes the firmware upgrade instruction information to the user, wherein the firmware upgrade instruction information is configured to remind the user that the target intelligent device needs to upgrade the firmware.

In the solution provided by the aspect of the present disclosure, if no operation response returned by the target intelligent device is received within a preset time period, or it is detected that a current firmware version of the target intelligent device is not the latest version, firmware upgrade instruction information is pushed to the user. Thereby, it can ensure that the firmware version of the target intelligent device is the latest version.

Regarding the server and the control device in the above aspect, the specific manner for performing the operations has been described in detail in the aspects related to the methods, which will not be repeated herein.

Figure 11:
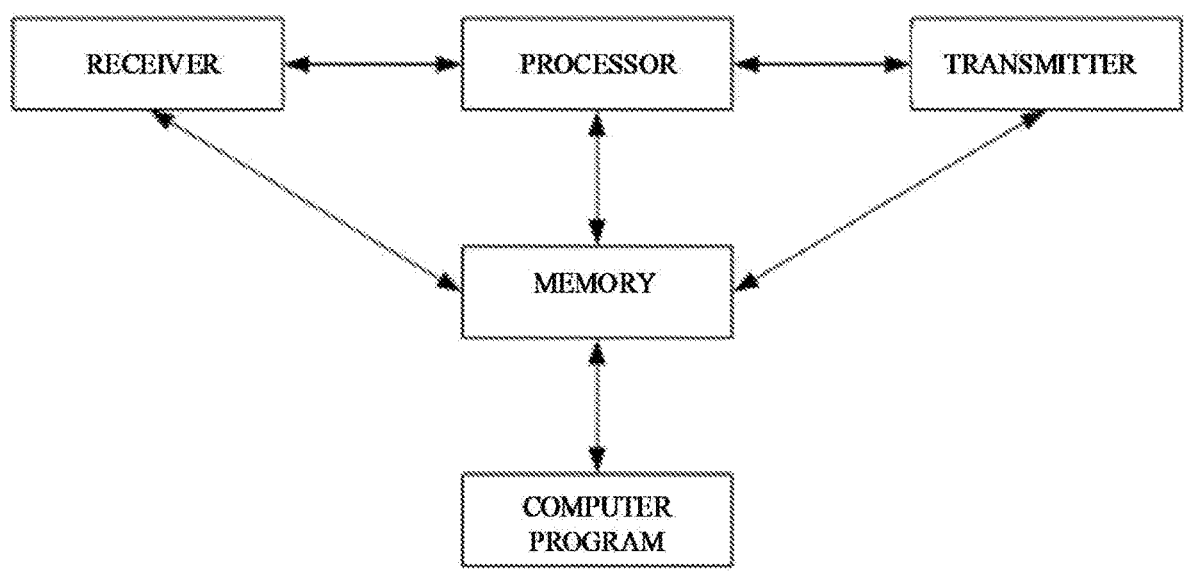
FIG. 11 is a block diagram of an electronic device entity according to an exemplary aspect of the present disclosure.

FIG. 11 is a block diagram of an electronic device entity according to an exemplary aspect. Referring to FIG. 11, a control device provided by an aspect of the present disclosure includes: a receiver, a transmitter, a memory, a processor, and a computer program, wherein the processor runs the computer program to:

perform semantic recognition processing on collected voice data of a user to obtain a recognition result;

determine a target intelligent device according to device information in the recognition result;

generate a control command according to operation instruction information in the recognition result; and send the control command to the target intelligent device.

In the above aspects, it should be understood that the processor may be a central processing unit (CPU), or may be other general-purpose processors, digital signal processors (DSP), Application Specific Integrated Circuit (ASIC). The general-purpose processor may be a microprocessor, or the processor may also be any conventional processor, etc. The foregoing memory may be a read-only memory (ROM), a random access memory (RAM), a flash memory, a hard disk or a solid state disk. The steps of the method disclosed in the aspects of the present disclosure may be directly implemented by a hardware processor, or may be implemented by a combination of hardware and software modules in the processor.

The present application further provides a computer readable storage medium having stored thereon a computer program, which when executed by a processor, implements the technical solution of the method for controlling an intelligent device according to any of the foregoing solutions.

Figure 12:
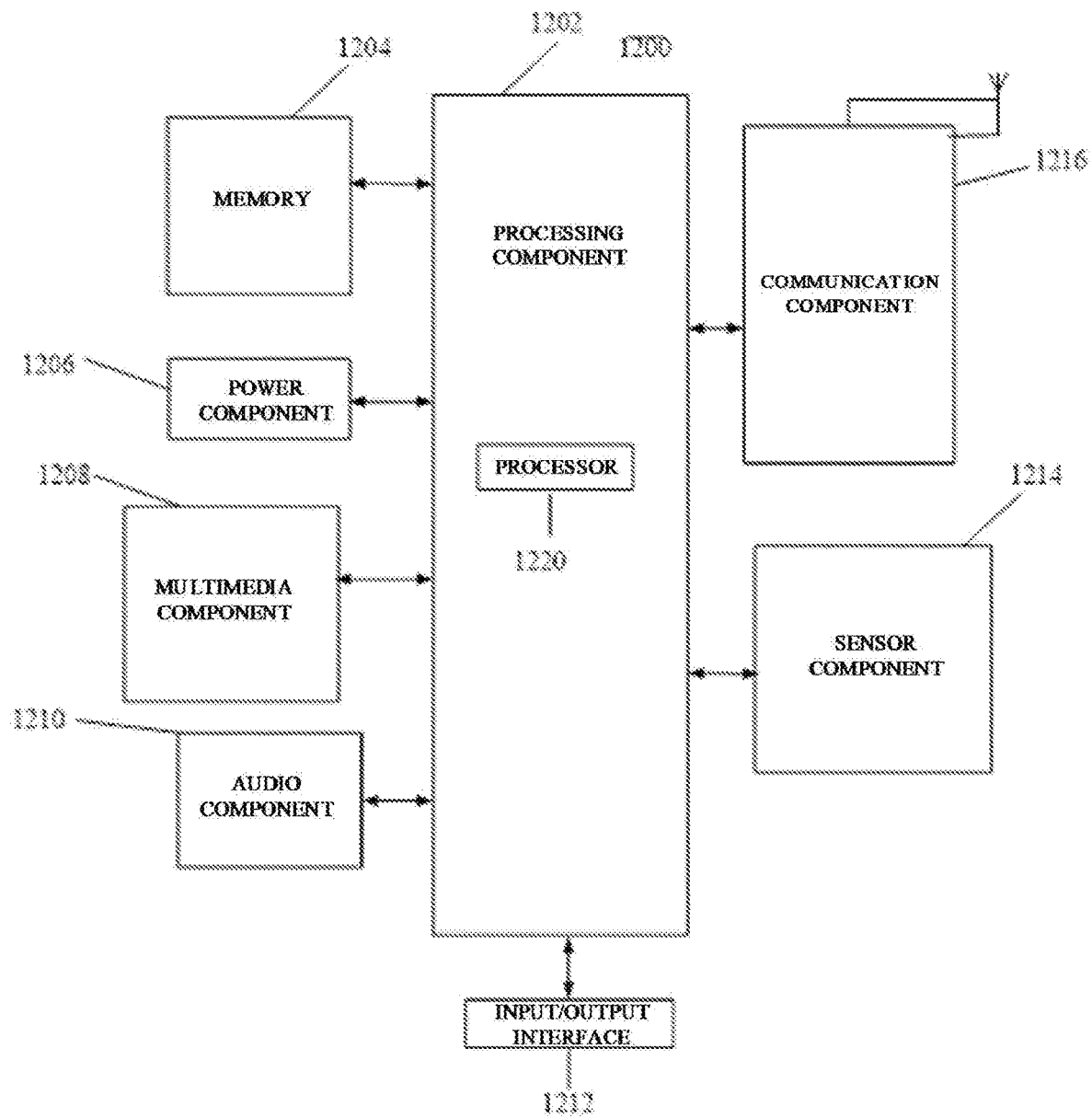
FIG. 12 is a block diagram of a control device 1200 according to an exemplary aspect of the present disclosure.

The electronic device of the present disclosure may be a control device, may be a server, or may also be a control system (including a control device and a server). Referring to FIG. 12, FIG. 12 is a block diagram of a control device 1200 according to an exemplary aspect. For example, the control device may be a user's mobile phone, tablet, or the like.

Referring to FIG. 12, a control device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the control device 1200, such as the operations associated with display, data communications, multimedia operations, and recording operations. The processing component 1202 may include one or more processors 1220 to execute instructions, to perform all or part of the steps of the above method. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the control device 1200. Examples of such data include instructions for any applications or methods operated on the control device 1200, various data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the control device 1200. The power component 1206 may include a power management system, one or more power sources, and any other components associated with the generation, management, and distribution of power in the control device 1200.

The multimedia component 1208 includes a screen providing an output interface between the control device 1200 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 1210 is configured to output and/or input audio signals. For example, the audio component 1210 includes a microphone ("MIC") configured to receive an external audio signal when the control device 1200 is in an operation mode, such as a call mode, a recording mode, and a voice recognition mode. The received audio signal may be further stored in the memory 1204 or transmitted via the communication component 1216. In some aspects, the audio component 1210 further includes a speaker to output audio signals.

The I/O interface 1212 provides an interface between the processing component 1202 and peripheral interface modules, such as a keyboard, a click wheel, buttons, and the like.

The sensor component 1214 includes one or more sensors to provide status assessments of various aspects of the control device 1200. For instance, the sensor component 1214 may detect an open/closed status of the control device 1200, relative positioning of components, e.g., the display and the keypad, of the control device 1200, a change in position of the control device 1200 or a component of the control device 1200, a presence or absence of user contact with the control device 1200, an orientation or an acceleration/deceleration of the control device 1200, and a change in temperature of the control device 1200. The sensor component 1214 may include a proximity sensor configured to detect the presence of nearby objects without any physical contact. The sensor component 1214 may also include a light sensor, such as a CMOS or CCD image sensor, for use in imaging applications. In some aspects, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the control device 1200 and other devices. The control device 1200 can access a wireless network based on a communication standard, such as WiFi, 2G, or 3G, or a combination thereof. In one exemplary aspect, the communication component 1216 receives a broadcast signal or broadcast associated information from an external broadcast management system via a broadcast channel. In one exemplary aspect, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the control device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above method for controlling an intelligent device, the method including:

performing semantic recognition processing on collected voice data of a user to obtain a recognition result;

determining a target intelligent device according to device information in the recognition result;

generating a control command according to operation instruction information in the recognition result; and sending the control command to the target intelligent device.

In exemplary aspects, there is also provided a non-transitory computer-readable storage medium including instructions, such as included in the memory 1204, executable by the processor 1220 in the control device 1200 to perform the above method for controlling an intelligent device. For example, the non-transitory computer-readable storage medium may be a ROM, a RAM, a CD-ROM, a magnetic tape, a floppy disc, an optical data storage device, and the like.

Figure 13:
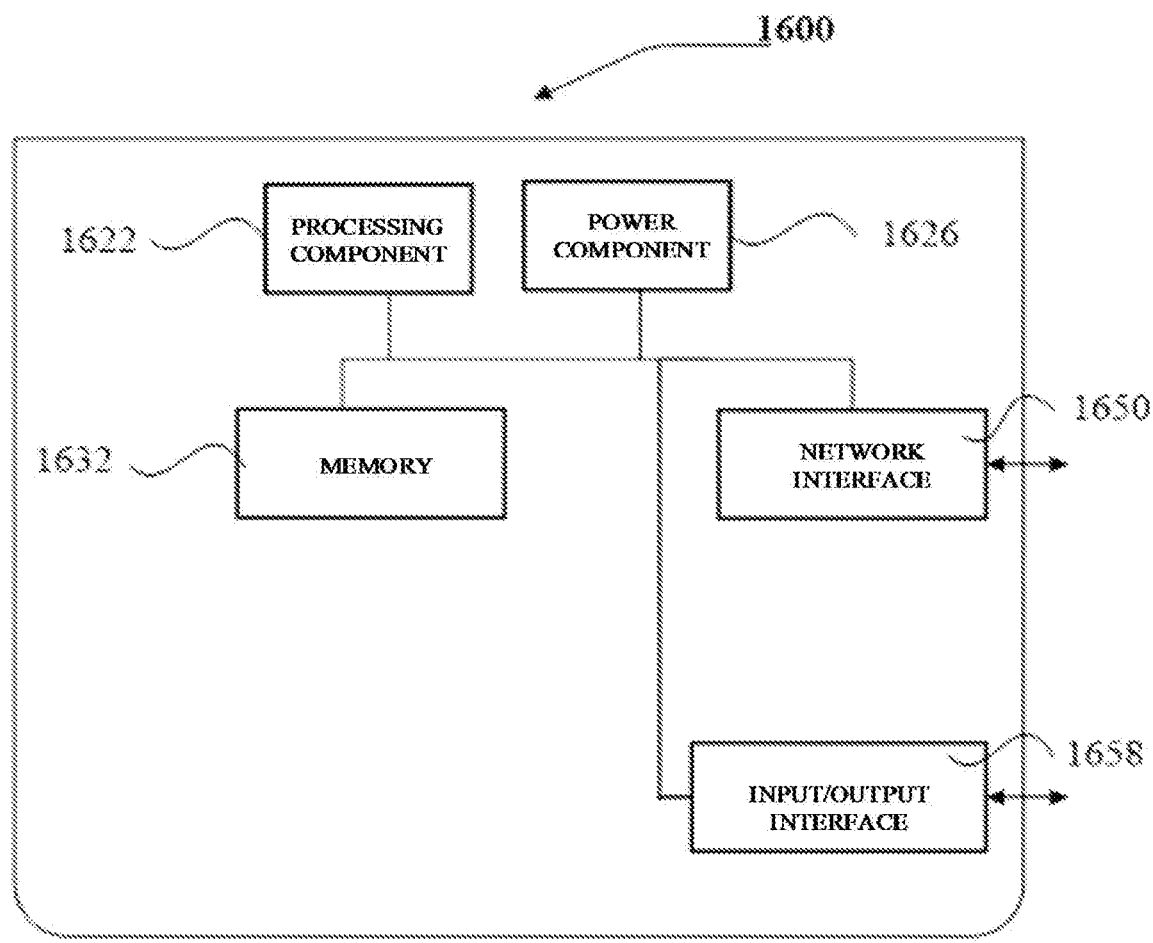
FIG. 13 is a block diagram of a server 1600 according to an exemplary aspect of the present disclosure.

FIG. 13 is a block diagram of a server 1600 according to an exemplary aspect. Referring to FIG. 13, the server 1600 includes a processing component 1622 that further includes one or more processors, and memory resources represented by a memory 1632 for storing instructions executable by the processing component 1622, such as an application. An application stored in the memory 1632 can include one or more modules each corresponding to a set of instructions. In addition, the processing component 1622 is configured to execute instructions to perform the above-described method for controlling an intelligent device on the server side, the method including:

performing semantic recognition processing on collected voice data of a user to obtain a recognition result;

determining a target intelligent device according to device information in the recognition result;

generating a control command according to operation instruction information in the recognition result; and sending the control command to the target intelligent device.

The server 1600 can also include a power component 1626 configured to perform power management of the apparatus 1600, a wired or wireless network interface 1650 configured to connect the apparatus 1600 to the network, and an input/output (I/O) interface 1658. The apparatus 1600 can operate based on an operating system stored in a memory 1632, such as Windows Server™, Mac OS X™, Unix™, Linux™, FreeBSD™ or the like.

In the method, the apparatus, the system and the device for controlling an intelligent device, and the storage medium provided by the aspects of the present disclosure, the method for controlling an intelligent device provided by the aspect of the present disclosure includes: performing semantic recognition processing on collected voice data of the user to obtain a recognition result, determining a target intelligent device according to device information in the recognition result, generating a control command according to operation instruction information in the recognition result, and sending the control command to the target intelligent device. It can realize control over the intelligent device according to the user's intention, and can improve the user experience.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for controlling an intelligent device, comprising:

collecting voice data of a user;

performing semantic recognition processing on the collected voice data of the user to obtain a recognition result;

determining a target intelligent device based on device information in the recognition result;

generating a control command based on operation instruction information in the recognition result;

sending the control command to the target intelligent device; and if receiving no operation response from the target intelligent device within a preset time period, or detecting that a current firmware version of the target intelligent device is not a latest version, pushing firmware version upgrade instruction information to the user, wherein the firmware version upgrade instruction information reminds the user that the current firmware version of the target intelligent device needs to be upgraded.

2. The method according to claim 1, further comprising:

determining and storing device information of the intelligent device in advance, wherein the device information comprises first device information or second device information, the first device information is provided by the intelligent device, and the second device information is input by the user, and wherein the first device information comprises at least one of: device identification information, device state information, device attribute information, and information on firm dare used by the intelligent device, and wherein the second device information comprises at least one of device location information, and device name information.

3. The method according to claim 2, wherein determining the target intelligent device based on the device information in the recognition result comprises:

determining, from stored information of intelligent devices, device information that matches the device information in the recognition result; and determining an intelligent device corresponding to the matching device information as the target intelligent device.

4. The method according to claim 3, wherein after determining the device information that matches the device information in the recognition result, the method further comprises:

acquiring a current online state of the intelligent device corresponding to the matching device information, and wherein determining the intelligent device corresponding to the matching device information as the target intelligent device comprises:

among intelligent devices corresponding to the matching device information, determining an intelligent device that is currently online as the target intelligent device.

5. The method according to claim 1, wherein for the operation instruction information characterizing that an attribute value of a corresponding attribute of the target intelligent device needs to be modified, generating the control command based on the operation instruction information in the recognition result comprises:
acquiring a current attribute value of a corresponding attribute of the target intelligent device;
determining a modified attribute value based on the operation instruction information; and
generating a control command based on the modified attribute value.

6. An electronic device, comprising:
a receiver;
a transmitter;
a processing circuitry; and
a memory configured to store instructions executable by the processing circuitry,
wherein the processing circuitry is configured to:
collect voice data of a user;
perform semantic recognition processing on the collected voice data of the user to obtain a recognition result;
determine a target intelligent device based on device information in the recognition result;
generate a control command based on operation instruction information in the recognition result;
send the control command to the target intelligent device; and
if receiving no operation response from the target intelligent device within a preset time period, or detecting that a current firmware version of the target intelligent device is not a latest version, push firmware version upgrade instruction information to the user, wherein the firmware version upgrade instruction information reminds the user that the current firmware version of the target intelligent device needs to be upgraded.

7. The electronic device according to claim 6, wherein the processing circuit processor is further configured to:
determine and store device information of the target intelligent device in advance,
wherein the device information comprises first device information or second device information, the first device information is provided by the target intelligent device, and the second device information is input by the user, and
wherein the first device information comprises at least one of: device identification information, device state information, device attribute information, and information on firmware used by the electronic device, and
wherein the second device information comprises at least one of device location information, and device name information.

8. The electronic device according to claim 7, wherein when determining the target intelligent device based on the device information in the recognition result, the processing circuitry is further configured to:
determine, from stored information of intelligent devices, device information that matches the device information in the recognition result; and
determine an intelligent device corresponding to the matching device information as the target intelligent device.

9. The electronic device according to claim 8, wherein after determining the device information that matches the device information in the recognition result, the processing circuitry is further configured to:
acquire a current online state of the intelligent device corresponding to the matching device information, and
wherein when determining the intelligent device corresponding to the matching device information as the target intelligent device, the processing circuitry is further configured to:
among intelligent devices corresponding to the matching device information, determine an intelligent device that is currently online as the target intelligent device.

10. The electronic device according to claim 6, wherein for the operation instruction information characterizing that an attribute value of a corresponding attribute of the target intelligent device needs to be modified, when generating the control command based on the operation instruction information in the recognition result, the processing circuitry is further configured to:
acquire a current attribute value of a corresponding attribute of the target intelligent device;
determine a modified attribute value based on the operation instruction information; and
generate a control command based on the modified attribute value.

11. A non-transitory computer-readable storage medium having stored thereon instructions that, when executed by a processor, cause the processor to:
collect voice data of a user;
perform semantic recognition processing on the collected voice data of the user to obtain a recognition result;
determine a target intelligent device based on device information in the recognition result;
generate a control command based on operation instruction information in the recognition result;
send the control command to the target intelligent device; and
if receiving no operation response from the target intelligent device within a preset time period, or detecting that a current firmware version of the target intelligent device is not a latest version, push firmware version upgrade instruction information to the user, wherein the firmware version upgrade instruction information reminds the user that the current firmware version of the tartlet intelligent device needs to be upgraded.

12. The non-transitory computer-readable storage medium according to claim 11, wherein the instructions further cause the processor to:
determine and store device information of the target intelligent device in advance,
wherein the device information comprises first device information or second device information, the first device information is provided by the target intelligent device, and the second device information is input by the user, and
wherein the first device information comprises at least one of: device identification information, device state information, device attribute information, and information on firmware used by the device, and
wherein the second device information comprises at least one of device location information, and device name information.

13. The non-transitory computer-readable storage medium according to claim 12, wherein when determining the target intelligent device based on the device information in the recognition result, the instructions further cause the processor to:

determine; from stored information of intelligent devices, device information that matches the device information in the recognition result; and determine an intelligent device corresponding to the matching device information as the target intelligent device.

14. The non-transitory computer-readable storage medium according to claim 13, wherein after determining the device information that matches the device information in the recognition result, the instructions further cause the processor to:

acquire a current online state of the intelligent device corresponding to the matching device information, and wherein when determining the intelligent device corresponding to the matching device information as the target intelligent device, the instructions further cause the processor to:

among intelligent devices corresponding to the matching device information, determine an intelligent device that is currently online as the target intelligent device.

15. The non-transitory computer-readable storage medium according to claim 11, wherein for the operation instruction information characterizing that an attribute value of a corresponding attribute of the target intelligent device needs to be modified, when generating the control command based on the operation instruction information in the recognition result, the instructions further cause the processor to:

acquire a current attribute value of a corresponding attribute of the target intelligent device;

determine a modified attribute value based on the operation instruction information; and generate a control command based on the modified attribute value.

* * * * *